United States Patent
Kadah

[11] Patent Number: 6,118,239
[45] Date of Patent: Sep. 12, 2000

[54] SPEED CONTROL DRIVE CIRCUIT FOR BLOWER MOTOR

[76] Inventor: Andrew S. Kadah, 5000 Hennaberry Rd., Manlius, N.Y. 13104

[21] Appl. No.: 09/197,880

[22] Filed: Nov. 23, 1998

[51] Int. Cl.[7] .................................................. H02P 5/00
[52] U.S. Cl. ........................ 318/268; 318/798; 318/810; 318/438
[58] Field of Search ........................ 318/268, 798–810, 318/438

[56] References Cited

U.S. PATENT DOCUMENTS

| | | | |
|---|---|---|---|
| 3,588,650 | 6/1971 | Bevis | 318/227 |
| 3,801,888 | 4/1974 | Faulkner | 318/471 |
| 4,451,112 | 5/1984 | Hattori et al. | 318/778 |
| 4,465,957 | 8/1984 | Crockett | 318/345 |
| 4,640,389 | 2/1987 | Kamike | 187/119 |
| 4,673,850 | 6/1987 | Maudlin | 318/305 |
| 4,722,669 | 2/1988 | Kundert | 417/32 |
| 4,734,012 | 3/1988 | Dob et al. | 417/32 |
| 4,808,865 | 2/1989 | King | 310/71 |
| 4,879,503 | 11/1989 | Aoki et al. | 318/809 |
| 4,935,684 | 6/1990 | Watanabe | 318/729 |
| 4,958,118 | 9/1990 | Pottebaum | 318/727 |
| 4,978,896 | 12/1990 | Shah | 318/254 |
| 5,151,641 | 9/1992 | Shamoto | 318/762 |
| 5,359,154 | 10/1994 | Tsukasa et al. | 177/145 |
| 5,364,026 | 11/1994 | Kundert | 236/49.3 |
| 5,410,230 | 4/1995 | Bessler et al. | 318/471 |
| 5,656,897 | 8/1997 | Carobolantte et al. | 318/254 |
| 5,883,490 | 3/1999 | Moreira | 318/807 |
| 5,994,856 | 11/1999 | Menegoli | 318/254 |

OTHER PUBLICATIONS

Kaufhold et al., Failure Mechanism of the Interturn Insulation of Low Voltage Electric Machines fed by Pulse–Controlled Inverters, IEEE Electrical Insulation Magazine, Sep. 1996, p. 9.

Kaufman et al., High Performance Servo Drives for Machine–Tool Applications using AC Motors, IEEE Proceedings, 1982, p. 604.

*Primary Examiner*—Bentsu Ro
*Assistant Examiner*—Rita Leykin
*Attorney, Agent, or Firm*—Trapani & Molldrem

[57] ABSTRACT

Drive circuit for a blower motor employs a microprocessor control element, a controlled rectifier to provide DC power at a controlled rail voltage, and an inverter employing a pair of switching transistors arranged as a bridge inverter or half-bridge inverter. The drive circuit operates over a range of blower speeds and varies both the frequency and amplitude of bipolar pulses that are applied to the blower motor armature.

15 Claims, 4 Drawing Sheets

SPEED CONTROL DRIVE CIRCUIT FOR BLOWER MOTOR

BACKGROUND OF THE INVENTION

The present invention relates to drive circuits for powering AC motors, and is especially directed to a speed control circuit that generates bipolar pulses to power a motor, such as an AC induction motor. The invention is especially directed to an arrangement for controlling the air flow into an air conditioned space, with blower speed being controlled in accordance with air conditioning load, in a manner to conserve electrical energy when the blower is operated at operating speed or lower speed, and in a manner that avoids insulation breakdown to the blower motor.

In HVAC systems, such as home air conditioning systems, it is often necessary to change the fan speed or blower speed to control the amount of air flow through the system evaporator coil. Cold, dry air is considerably heavier than warm moist air, and so during initial operation the blower has to operate at high speed to pump conditioned air, especially to higher floors. Then, when the comfort space or living space has cooled down, the fan speed is reduced to avoid blowing cold air directly on human occupants. Also, where sensible cooling is needed, rather than latent cooling (dehumidification) the blower is operated at higher speed to increase air flow. Correspondingly, if dehumidification is required more than sensible cooling, the air flow rate should be reduced, requiring a slower blower speed. Other air conditioning load considerations can also create air flow requirements to govern blower speed, such as heat and humidity requirements for indoor plants, or preservation of expensive art works or musical instruments.

Various approaches to control of a blower motor are discussed in the art. U.S. Pat. No. 4,978,896 to Shah discusses the need to maintain rotational speed over a range of static pressures to keep air flow at a desired level. A microprocessor generates a pulse width modulated (PWM) signal for motor drive power, and uses a motor current sensor as a feedback. U.S. Pat. No. 4,734,012 to Dob et al. discusses a speed control circuit for a blower motor, in which AC voltage is rectified and regulated responsive to an ambient temperature, and then an optoisolator and a triac control the AC through the motor. U.S. Pat. No. 4,879,503 to Aoki et al. discusses a blower motor control for an air conditioner that controls the blower motor rotational speed by comparing it with a target speed. Here, a microcomputer looks for zero crossings of the motor drive, and emits pulses to actuate a triac in series with the motor armature. Another approach to fan or blower speed control is discussed in U.S. Pat. No. 4,722,669 to Kundert, where a DC motor is energized in a unipolar pulsed DC mode.

A recent approach to motor control, which was designed to create control over motor speed over a wide power range, e.g., from several watts to several kilowatts, has been an adjustable speed drive (ASD) employing a pulse-controlled inverter. In these ASD's the incoming AC power is rectified to produce a constant DC level, and that is converted to an AC drive wave using pulse-width modulation (PWM). These ASD's overcome the shortcomings of operating induction motors directly on line voltage, and satisfy many of the requirements for speed control. Unfortunately, the use of PWM can lead to other problems, including winding insulation failure in the motor armature.

In the PWM ASD drive circuit, the DC voltage is usually gated or switched on and off several times per half-cycle to create a drive wave of the appropriate power characteristic. The many pulses for each half wave are intended to regenerate a sinusoidal wave, using Fourier transform principles. This means that there are many very short pulses at the DC rail voltage, each with a very short rise time. Typically, where an IGBT bridge converter is used, the switching frequencies can be on the order of 20 kHz or more, with rise times of between 20 and 100 ns. At the same time, the insulation in the motor's armature windings have a limited insulation strength, and the high frequency pulses that occur in these ASDs can overstress the interturn winding insulation. In many motors, where the windings are randomly wound, the interturn high frequency voltages can be even more exaggerated. This problem is discussed in Kaufhold et al., Failure Mechanism of the Interturn Insulation of Low Voltage Electric Machines Fed by Pulse-Controlled Inverters, IEEE Electrical Insulation Magazine, September/October 1996, pp. 9 to 16. The problem of using high switching frequencies for variable speed PWM drives of this type is also discussed in Lowery, General Purpose Variable-Speed Drive and Motor Application Considerations, ASHRAE Transactions 1998, vol. 104, pt. 2. Because of the finite rise times of the switching pulses, the switching transistors of the inverter spend a finite time in their active range when the transistor transitions between cut off and conduction. In that region, energy is converted to waste heat. This problem becomes exaggerated where there are multiple high frequency pulses for each half cycle of the drive wave.

OBJECTS AND SUMMARY OF THE INVENTION

It is an object of this invention to provide a control or driver circuit for an AC blower motor that avoids the drawbacks of the prior art as mentioned above.

It is another object to provide a speed control or driver circuit that achieves efficient operation of a blower motor over a wide range of blower speeds and air flow rates, but without the danger of overstressing the armature insulation.

It is a further object to provide a motor speed control or driver circuit that is reliable and efficient, and which can be easily controlled by the user, e.g., from the thermostat.

It is another object to provide a motor speed control or driver circuit that operates at great efficiency and at much reduced power requirements in low speed operation.

According to an aspect of the invention, a speed control drive circuit provides a drive wave to the armature of an AC-powered blower motor, e.g., an AC induction motor. The drive wave is a train of bipolar drive pulses whose pulse amplitude and pulse frequency are controlled in accordance with the selection of blower speed. AC power input power is derived from AC line, either three-phase having three conductors or single-phase, having at least first and second AC conductors. A triac or other controlled thyristor switch (e.g., one or more SCRs) has a main current terminal connected to the first ac conductor, a second main current terminal, and a gate and a full wave rectifier or other rectifier means has AC inputs connected respectively to the second main current terminal and to said second ac conductor, and DC output rails at which rectified DC voltage is provided. A smoothing capacitor can be connected between the DC rails. A bridge inverter circuit, i.e., either a full bridge or half bridge, has DC inputs connected to the DC rails and outputs providing the bipolar drive pulses to the motor armature. In an alternative embodiment, the rectifier bridge can be comprised of silicon controlled rectifiers (SCRs) or similar thyristor devices that receive gating signals from the microprocessor.

Blower speed can be selected automatically based on heat or air conditioning load, or can be manually selected by the user, employing a selector mechanism which can be in the associated wall thermostat. Blower speed can be anywhere in a range from low speed to high speed, or can be at two or more discrete values, e.g., low speed and full speed, or any speed in between.

A microprocessor based control circuit has an input coupled to the selector means, a drive output that provides an output drive signal to the bridge circuit at a frequency corresponding to the selected blower speed, and pick-off voltage selecting means having an output coupled to the gate of the thyristor switch to control the turning on of the latter. The level of the rectified DC voltage corresponds with the selected blower speed, so that the pulse amplitude of the motor drive wave varies with the selected blower speed. The pulse frequency of the drive wave also varies with the selected blower speed.

A hall-effect magnetic detector, or other suitable motor speed monitor, can provide a motor speed feedback signal to the microprocessor.

In this drive system, both pulse frequency and pulse amplitude are controlled in accordance with the blower motor speed, i.e., in accordance with the desired air flow rate. Unlike the PWM drive systems mentioned before, there is much reduced risk of creating high interturn voltages that can pierce the insulation. Also, because the transistors in the bridge inverter switch on and off only once per half cycle, the transistors spend very little time crossing their active regions, and this also reduces the stress on the transistors as compared with PWM ASD circuits.

The drive circuit acts to provide drive pulses in which the pulse amplitude, i.e., the DC voltage feed to the inverter, is increased or decreased in accordance with demand for more or less blower speed. The pulse rate or frequency is likewise controlled in accordance with the demand for more or less motor speed. The drive pulses have only one pulse for each half cycle of the drive wave, and thus avoid the high-frequency problems discussed above.

The drive circuit of this invention is of a simple, straight-forward design. The circuit is inherently compact and is relatively inexpensive, and avoids energy waste.

The above and many other objects, features, and advantages of this invention will become apparent from the ensuing description of a preferred embodiment, which should be read in conjunction with the accompanying Drawing.

DETAILED DESCRIPTION OF A PREFERRED EMBODIMENT

Figure 1:
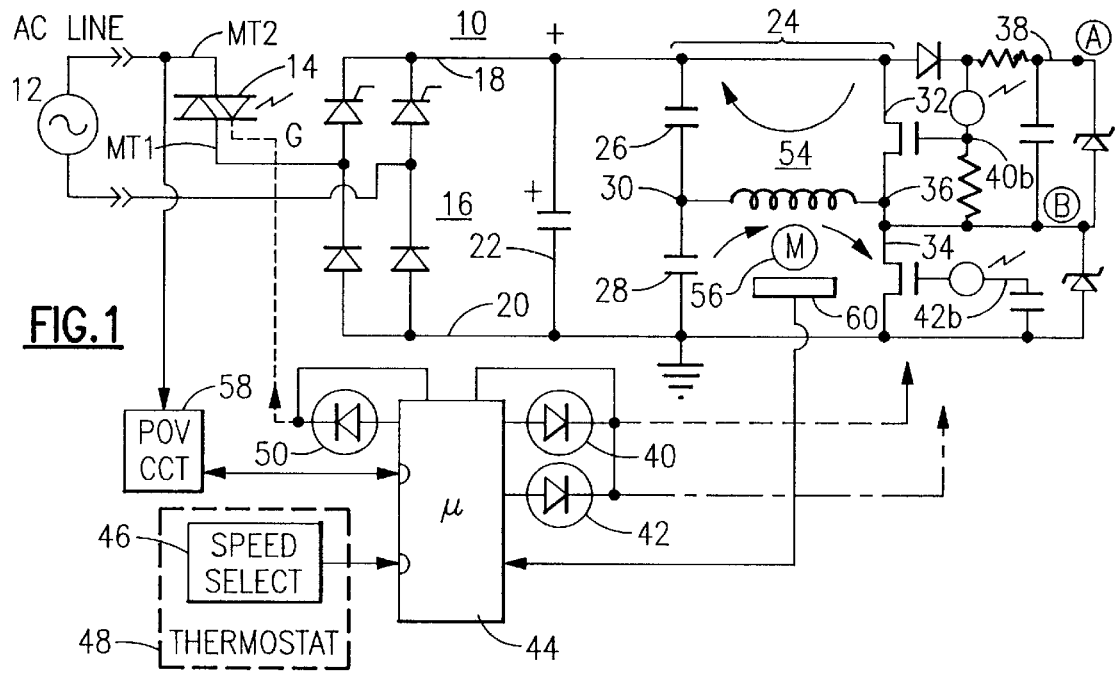
FIG. 1 is a circuit diagram for a speed control drive circuit for an ac-powered blower motor, according to one possible embodiment of the present invention.

With reference to the Drawing, FIG. 1 is a circuit diagram of an illustrative embodiment of a pulse-amplitude modulated (PAM) and pulse rate modulated blower motor drive circuit 10. Here there is a single-phase AC voltage source 12, e.g., a nominal 120 volts AC at 60 Hz, for example, line power. For sake of simplicity, a single-phase system is illustrated here, but persons of ordinary skill could easily apply the principles of this invention to polyphase line power, and could apply the invention to a drive system for a three-phase AC induction motor, if desired. The AC source 12 is supplied through a triac 14 (here, a phototriac) to inputs of a full wave rectifier 16, which converts the voltage to direct current and applies it onto a positive rail 18 and a negative rail 20. In this case one AC conductor from the AC source 12 is connected to a main current terminal of the triac, and the other main current terminal is connected to one AC input of the rectifier 16. The other AC conductor from the AC source 12 is connected to the other AC input of the rectifier 16. A smoothing capacitor 22 is situated between the positive and negative rails 18,20.

An inverter 24, here in the form of a half-bridge inverter, is situated between the positive and negative DC rails. The inverter 24 has a pair of series capacitors 26, 28 forming one side of the bridge, with the capacitors defining a junction 30 between them. The other side of the bridge is formed by a pair of switching MOSFET transistors 32, 34 in series, with a junction 36 defined between the source of the upper transistor 32 and the drain of the lower transistor 34. A drive circuit 38 for these two MOSFETs 32, 34 can include respective optoisolators 40, 42, with the receiver portions 40b, 42b driving the gates of the MOSFETs 32, 34, respectively.

A microprocessor control element 44 has an input connected to a blower speed selection element 46, for example, contained in a wall thermostat 48 of a heating, air conditioning, and/or heat pump system. The microprocessor control element 44 drives the transmitters 40a, 42a of the optoisolators 40, 42 to control the turning on and turning off of the transistors 32, 34, and likewise drives a triac-control LED 50 that is optically coupled to the gate of triac 14.

Figure 1A:
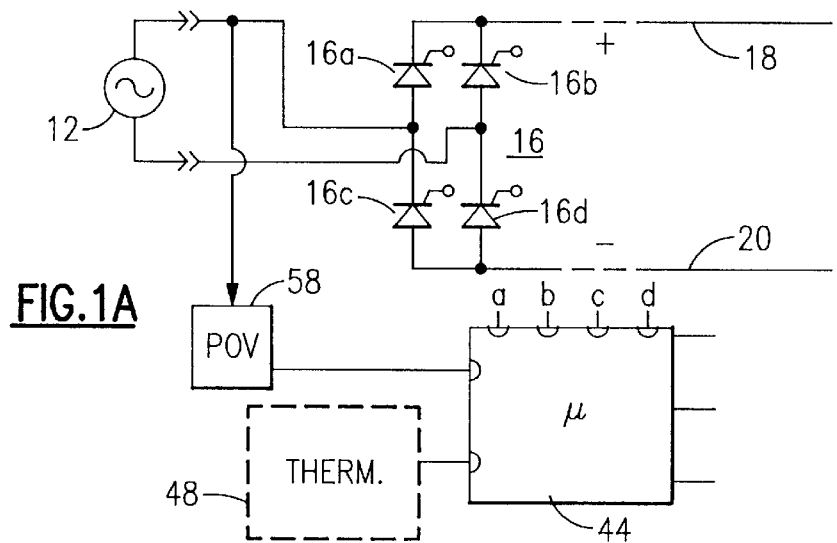
FIG. 1A is a circuit diagram showing one variation of this embodiment.

An alternative arrangement of the circuit of FIG. 1 is illustrated in FIG. 1A, in which a bridge circuit 16' is formed of one, two or four silicon controlled rectifiers or SCRs 16a, 16b, 16c, and 16d, and in which the triac 14 is omitted. The AC conductors from the AC power source 12 are coupled directly to the AC inputs of the SCR bridge 16'. Here the microprocessor control element 44 produces SCR gating signals a, b, c, and d that are fed to the gate terminals of these SCRS. The rest of the circuit is the sane as previously described with respect to FIG. 1. In either arrangement, the incoming AC wave shape is controlled so that the output DC rail voltage is controlled to a desired level.

The bridge inverter circuit operates alternately to charge and discharge the capacitors 26, 28 via the switching MOS-FET transistors 32, 34, with the junctions 30 and 36 serving as AC output electrodes. A load, e.g., the armature or stator winding 54 of a single-phase induction motor 56, is connected between the junctions 30 and 36. The bridge inverter 24 thus alternately charges and discharges the bridge capacitors 26, 28 through the winding 54 to drive the motor. The drive wave is in the form of alternate positive and negative pulses, whose amplitude and frequency each vary as a function of desired motor speed, as discussed shortly.

A pick-off voltage circuit 58, as also discussed below, is connected to one of the AC conductors of the AC source 12, and is also coupled to one or more input/output terminal of the microprocessor control element 44. This can be at least partly comprised of a functionality of the microprocessor control element. As is also shown, there can be an optional motor speed detector 60, e.g., a hall effect element, associated with the motor 56. The detector 60 has an output connected with the microprocessor control element 44. In a preferred mode, the circuit 58 detects zero crossings of the AC wave, and from these the microprocessor control element 44 can compute the AC period, i.e., a nominal 16.7 milliseconds at 60 Hz, and time to the point where the voltage is at a desired pickoff voltage, i.e., 6.0 milliseconds after zero crossing for 255 volts (out of 360 v peak). The bridge rectifier 16 and smoothing capacitor 22 develop this to a DC rail voltage of the desired level. The microprocessor control element 44 is programmed to decide how many microseconds after zero-crossing to actuate the triac 14, based on the desired operating speed for the motor 56. The speed signal from the motor speed detector 60 can be used in the microprocessor control element 44 to compute the timing of triac actuation.

The POV circuit 58, by identifying zero crossings, can also tell the microprocessor 44 what the actual line frequency is, as that can vary several hertz from the nominal frequency, i.e., from 60 Hz in North America or 50 Hz in Europe.

Figure 2:
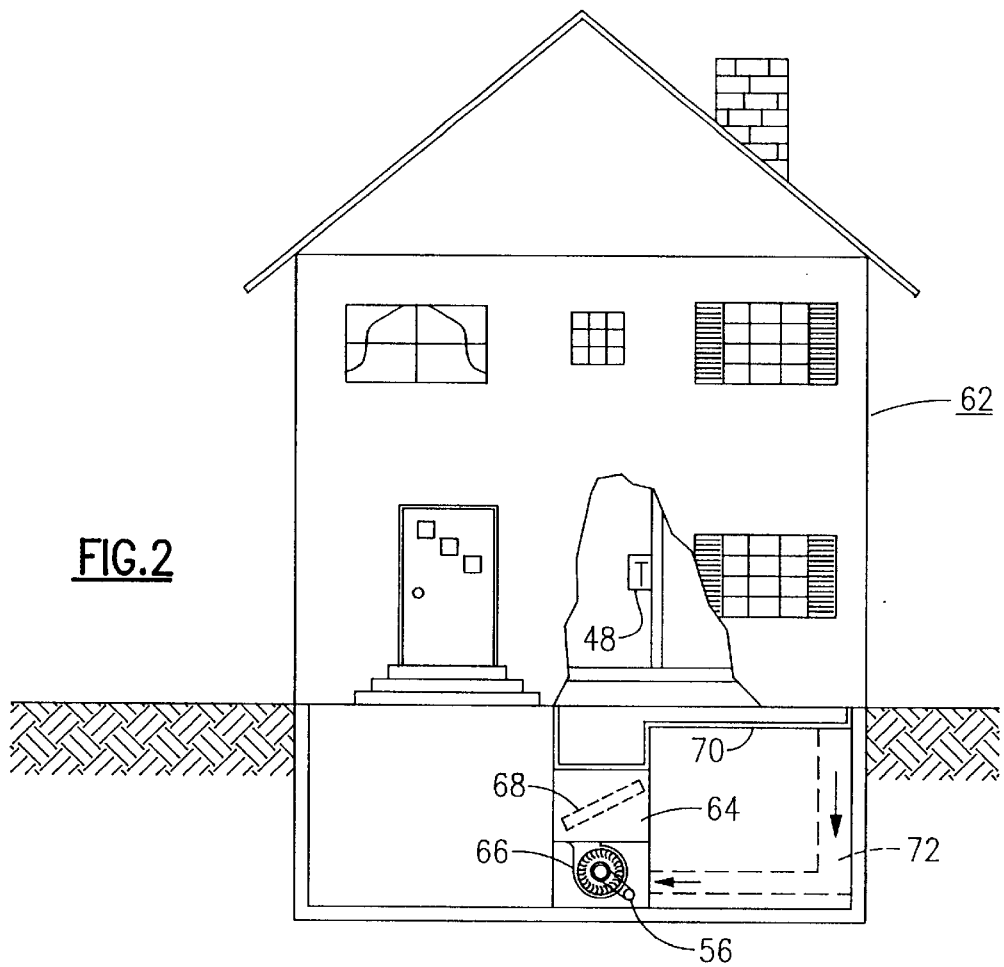
FIGS. 2 is an elevation of a home environment for explaining one possible application of this embodiment.

The motor control circuit of this invention can be employed suitably in a home heating and air conditioning system, as explained briefly with reference to FIG. 2. As shown, a dwelling 62 or other similar building has a furnace/air conditioning system 64 employing a fan or blower, here shown as a centrifugal blower 66 driven by the fan motor 56. The system also includes heating and air conditioning heat exchangers 68, with air supply ducting 70 that carries conditioned air (i.e., heated or cooled air) to the comfort space within the dwelling 62, and air return ducting 72 that brings air from the comfort space back to the intake of the blower 66. The thermostat 48 can be positioned on a wall within the comfort space.

The microprocessor control element is suitably programmed to carry out the process as described shortly, so as to provide gating pulses respectively to the optoisolator transmitters 40a, 42a and also to control the DC voltage between the rails 18, 20, and thereby control the pulse frequency and pulse amplitude of the drive wave for the motor armature 54.

Figure 3A:
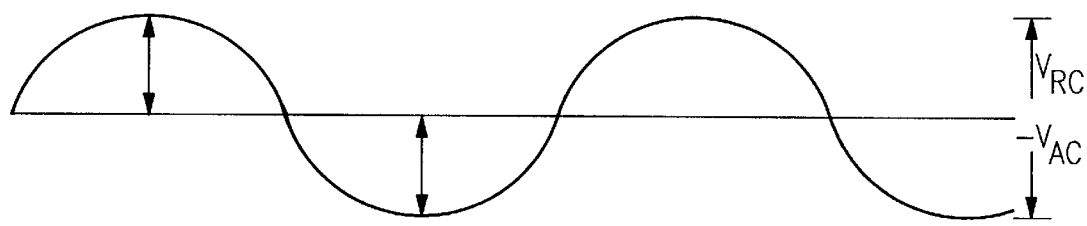
FIGS. 3A to 3E are wave charts for explaining operation of this embodiment.
Figure 3B:
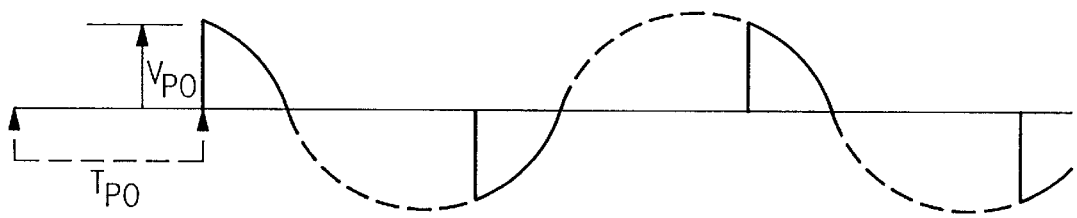
Figure 3C:
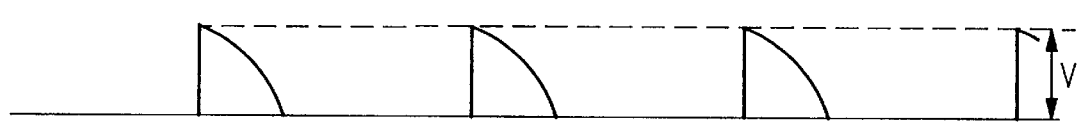
Figure 3D:
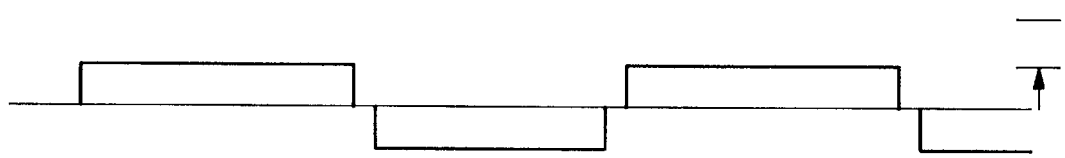
Figure 3E:
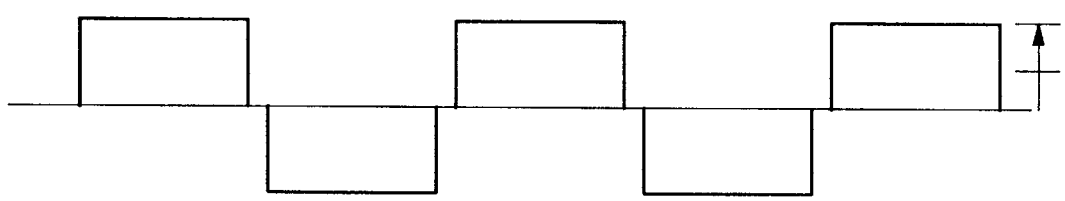

The AC input voltage from the AC source 12 appears on the upper AC conductor as a sinusoidal wave, as shown in FIG. 3A at 60 Hz, with a peak voltage $V_{AC}$ of 330 volts (220 volts RMS). The microprocessor control element 44 actuates the LED 50 to gate the triac 14 at a given time associated with a desired pickoff voltage $V_{PO}$ as shown in FIG. 3B to generate an alternating sawtooth waveform. This is fed to the rectifier 16 to produce unipolar, generally sawtooth pulses as shown in solid in FIG. 3C. These are smoothed by the capacitor 22 to produce a DC rail voltage V as shown in dash lines in FIG. 3C. The level of the DC rail voltage V is controlled by controlling the pickoff voltage $V_{PO}$, and this is carried out by the microprocessor control element 44 in response to signals from the speed select circuit 46. At the same time, the timing of the signals to the optoisolator transmitters 40a, 42a is also controlled by the microprocessor control element 44 in response to signalling from the speed select circuit, so that the switching pulse frequency of the bridge inverter 24 varies in accordance with the desired motor speed. For low motor speed, the inverter 24 produces long, low frequency pulses, at a lower voltage, as shown in FIG. 3D, while when higher motor speed is called for, the inverter produces higher frequency pulses, at a higher voltage, as shown in FIG. 3E. As shown here in both FIG. 3D and 3E, there is a brief OFF interval between the forward and reverse pulses. This precludes both the upper and lower MOSFET switching transistors 32, 34 being ON at the same time, which could short between the DC rails.

Also, while drive waves are shown here only for two speeds, it should be understood that there could be any number of drive speeds between very low speed and full speed, and that the drive could be infinitely variable if desired.

Figure 4:
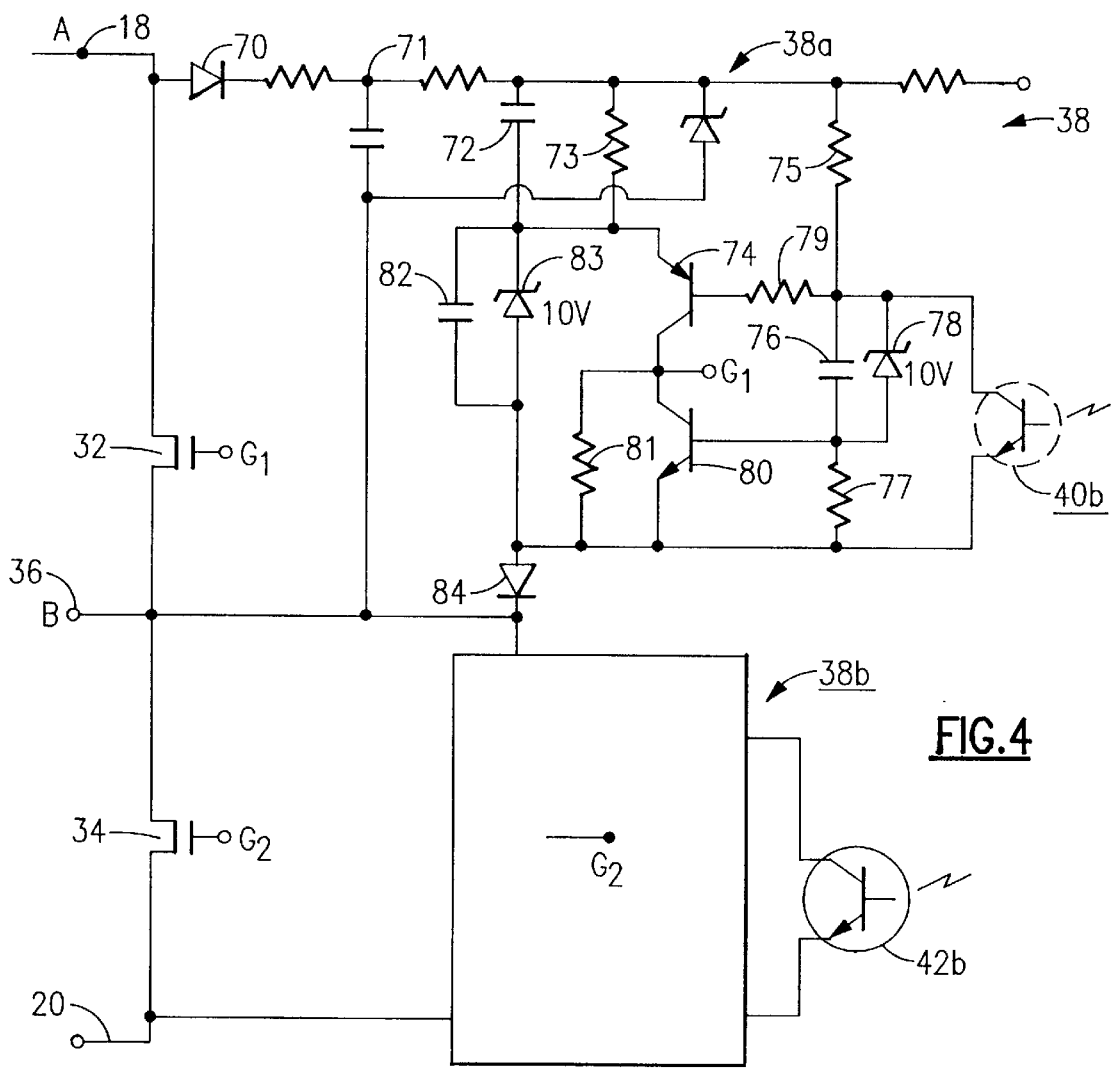
FIG. 4 is a circuit diagram of a portion of the bridge inverter according to an embodiment of this invention.

FIG. 4 shows an example of the drive circuit 38 for gating the switching MOSFET transistors 32 and 34. In FIG. 4, the upper half 38a of the drive circuit 38 is shown as a detailed schematic, and the lower half 38b is shown only symbolically. However, it is to be understood that the lower half 38b would be of similar construction.

In the circuit half 38a, there is a diode 70 connecting the upper (positive) rail 18 to an RC network 71, followed by a capacitor 72 and resistor 73 in parallel. The capacitor and resistor 72, 73 are connected to the emitter of a PNP transistor 74. A resistor 75, a capacitor 76, and another resistor 77 are connected in series, with a zener diode 78 being disposed in parallel with the capacitor 76 and connected to the junctions of the capacitor 76 with the resistors 75 and 77, respectively. The receiver part 40b of the optoisolator 40 has one output connected to the junction of the resistor 75 with the capacitor 76 and its other output connected to the lower end of the resistor 77. A resistor 79 connects the junction of the resistor 75 and capacitor 76 with the base of the transistor 74.

An NPN transistor 80 has its collector joined to the collector of the PNP transistor 74 to define a gating circuit point $g_1$, to be discussed shortly. The NPN transistor has its base connected to the junction of the capacitor 76 and resistor 77 and its emitter connected to the lower end of the resistor 77 and to the output of the optoisolator receiver 40b. There is a resistor 81 across the collector and emitter of this transistor 80, and a capacitor 82 and zener diode 83 in parallel between the emitter of transistor 74 and the emitter of transistor 80. A diode 84 goes from the emitter of transistor 80 to the junction point 36, i.e., to the source side of the switching MOSFET 42.

The drive circuit 38a is a push-pull circuit of complementary construction, and serves to provide a snap action gating for the MOSFET 32, and compensates for the rather slow response of the optoisolators 40, 42. Here, when the optoreceiver 40b is off, and then begins to switch into conduction, its output voltage will begin to fall. When this happens, the transistor 74 goes quickly from cutoff to conduction, and the transistor 80 goes quickly from conduction to cutoff, and the voltage appearing at the junction of their collectors, i.e., at point $g_1$, snaps from low to high. The point $g_1$ is connected to the gate of the MOSFET 32, and gates it on. Conversely, when the optoreceiver 40b is on, and then begins to switch towards cutoff, its output voltage begins to rise, and the voltage at the junction of the collectors of the transistors 74 and 80 snaps from high to low. The appearance of the low at point $g_1$ switches the MOSFET off.

As shown rather schematically, the lower circuit 38b connects to the outputs of the optoreceiver 42b and has a gating point $g_2$ that connects to the gate terminal of the lower MOSFET 36.

The accelerated, snap-action gating of the circuit 38 provides for faster and more accurate switching of the MOSFETs 32 and 36. Also, with the quick turn on and turn off, the MOSFETs 32 and 36 spend very little time transistioning across their active regions, thus cutting energy losses and limiting device heating. The arrangement avoids heat management problems for the MOSFET switching transistors, and permits the speed control circuit to be constructed out of smaller, and less expensive devices, which operate at very low power.

Figure 5:
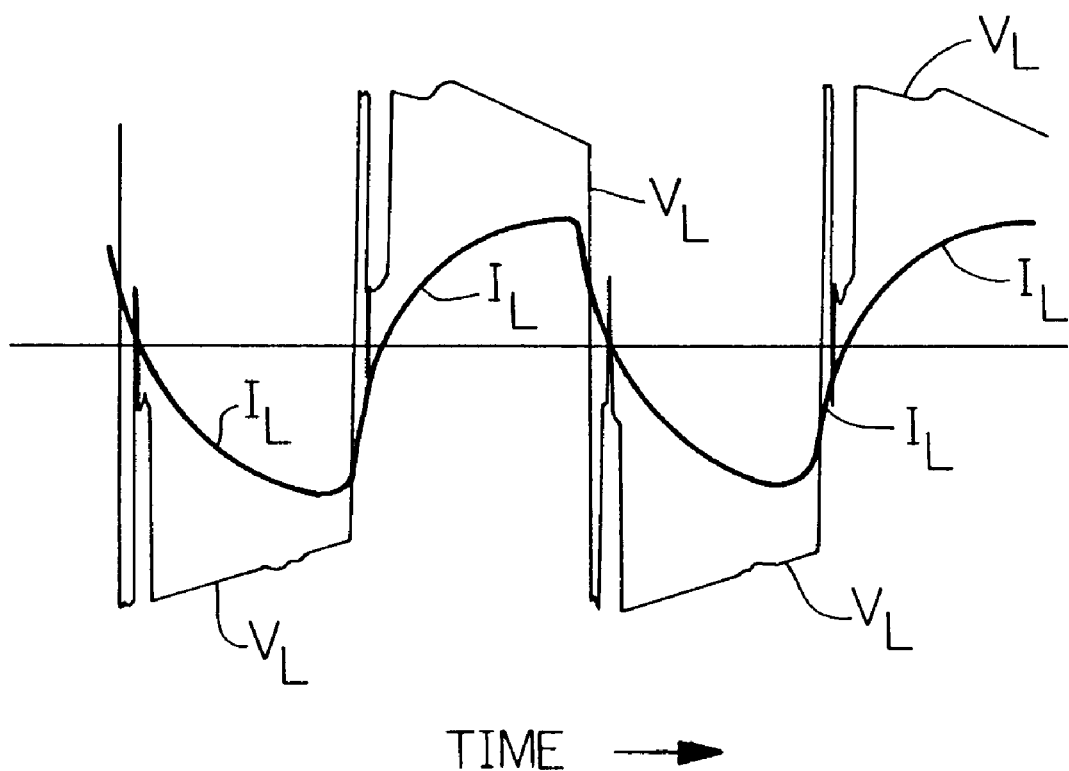
FIG. 5 is a wave chart for explaining the invention.

FIG. 5 illustrates an oscilloscope trace for load current $I_L$ and load voltage $V_L$ where the drive wave developed according to this invention is applied to the field winding of an AC induction motor, e.g., as shown in FIG. 3E. The square wave applied to the inductive winding produces a curved sawtooth waveform as the load current $I_L$, and the load voltage $V_L$ has a square waveform with a notch just after transistion. The real-axis power, which is the integral of the load voltage times load current, is maximized. This effect occurs because the odd harmonics (especially the third and fifth harmonics) of the power wave interfere constructively during the brief OFF interval of the drive wave (see FIGS. 3D, 3E). The square drive wave is also a higher torque waveform, and reduces motor slip and reduces $I^2R$ losses. Reduced slip results in an increased power factor, which approaches unity. In this embodiment, the power factor approaches 98 percent under load conditions.

The motor drive circuit of this invention can be adapted to drive higher load devices, such as air conditioning compressors. In such case the compressors can be driven at variable speeds, even where the compressor was designed for single speed operation. This permits the compressor capacity to change gracefully with the cooling load.

The bridge inverter can be a half-bridge design, as shown, with two MOSFET switches, IGBTs, bipolars, or other semiconductor switches, or can be of a full-bridge, four-switch design or of a three-phase, six-switch design.

With the circuits of this invention, power consumption is reduced by increasing efficiency, and by modulating the power at low speeds. The motor speed control arrangement of this invention is retrofittable on existing blower motors, and can be used with typical existing HVAC systems. Blower speed can be adjusted at the thermostat. Because switching occurs at low frequencies, there is less switching loss, and so smaller, more efficient semiconductors can be employed as the bridge inverter transistors. High frequency switching pulses are avoided, thus reducing the risk of interturn insulation breakdown in the blower motor. Also, because the drive circuit controls both amplitude and rate of the drive wave, great efficiencies can be achieved at lower speeds. With this invention a 50% reduction in airflow can result in an 80% savings in energy cost to power the blower. Similar savings are true with other load devices.

While the invention has been described in detail with reference to certain preferred embodiments, it should be understood that the invention is not limited to those precise embodiments. Rather, many modifications and variations would present themselves to persons skilled in the art without departure from the scope and spirit of the invention, as defined in the appended claims.

I claim:

1. A speed control drive circuit for providing to the armature of an ac-powered motor a train of bipolar drive pulses whose pulse amplitude and pulse frequency are controlled in accordance with a selection of motor speed, comprising:

a source of ac power having at least first and second ac conductors;

controlled rectifier means having ac inputs connected respectively to said first and second ac conductors, dc output rails at which a rectified dc voltage is provided, and at least one gate for controlling the ac power through the rectifier means thus to control the level of voltage at said dc output rails;

bridge inverter circuit means having dc inputs connected to said dc rails and outputs providing said bipolar drive pulses to the armature of said motor;

selector means for selecting a speed in a range including at least a low speed and full speed; and control circuit means having an input coupled to said selector means, a drive output providing an output drive signal to said bridge circuit means at a frequency corresponding to said selected speed, and pickoff voltage selecting means having an output coupled to the gate of said controlled rectifier means so that the level of said rectified dc voltage corresponds with the selected motor speed, wherein said pickoff voltage selecting means detects zero crossings of said ac power and computes a time to the point at which the ac voltage is at a desired pickoff voltage.

2. The speed control circuit of claim 1, wherein said selector means selects speeds in a continuous range from said low speed to said full speed.

3. The speed control circuit of claim 1, wherein said selector means includes a thermostat in which the speed is selected in accordance with detected thermal load conditions within a comfort space.

4. A speed control drive circuit for providing to the armature of an ac-powered motor a train of bipolar drive pulses whose pulse amplitude and pulse frequency are controlled in accordance with a selection of motor speed, comprising:

a source of ac power having at least first and second ac conductors;

controlled rectifier means having ac inputs connected respectively to said first and second ac conductors, dc output rails at which a rectified dc voltage is provided, and at least one gate for controlling the ac power through the rectifier means thus to control the level of voltage at said dc output rails;

bridge inverter circuit means having dc inputs connected to said dc rails and outputs providing said bipolar drive pulses to the armature of said motor;

selector means for selecting a speed in a range including at least a low speed and full speed; and control circuit means having an input coupled to said selector means, a drive output providing an output drive signal to said bridge circuit means at a frequency corresponding to said selected speed, and pickoff voltage selecting means having an output coupled to the gate of said controlled rectifier means so that the level of said rectified dc voltage corresponds with the selected motor speed;

wherein said controlled rectifier means includes a thyristor switch means having a main current terminal connected to the first ac conductor, a second main current terminal, and a gate; and a full wave rectifier having a pair of ac inputs connected respectively to said second main current terminal and to said second ac conductor, and in which said pickoff voltage selecting means is coupled to the gate of said thyristor switch means to control the turning on of the latter.

5. The speed control circuit of claim 4, wherein said controlled thyristor switch means includes a triac.

6. The speed control circuit of claim 1, wherein said bridge circuit means includes upper and lower switching transistors and respective gating circuits connected to receive the output drive signal from said control circuit means.

7. The speed control circuit of claim 6, wherein said control circuit means includes a microprocessor having output means providing respective gating pulses to the gating circuits of said upper and lower switching transistors to gate the latter alternately.

8. A speed control drive circuit for providing to the armature of an ac-powered motor a train of bipolar drive pulses whose pulse amplitude and pulse frequency are controlled in accordance with a selection of motor speed, comprising:

a source of ac power having at least first and second ac conductors;

controlled rectifier means having ac inputs connected respectively to said first and second ac conductors, dc output rails at which a rectified dc voltage is provided, and at least one gate for controlling the ac power through the rectifier means thus to control the level of voltage at said dc output rails;

bridge inverter circuit means having dc inputs connected to said dc rails and outputs providing said bipolar drive pulses to the armature of said motor;

selector means for selecting a speed in a range including at least a low speed and full speed; and control circuit means having an input coupled to said selector means, a drive output providing an output drive signal to said bridge circuit means at a frequency corresponding to said selected speed, and pickoff voltage selecting means having an output coupled to the gate of said controlled rectifier means so that the level of said rectified dc voltage corresponds with the selected motor speed;

wherein said bridge circuit means includes upper and lower switching transistors and respective gating circuits connected to receive the output drive signal from said control circuit means and having outputs respectively gating said upper and lower switching transistors; and wherein said gating circuits each comprise a push-pull arrangement to achieve snap action gating of the respective switching transistor; thereby minimizing the time that the upper and lower switching transistors transit across their active regions.

9. A speed control drive circuit for providing to the armature of an ac-powered motor a train of bipolar drive pulses whose pulse amplitude and pulse frequency are controlled in accordance with a selection of motor speed, comprising:

a source of ac power having at least first and second ac conductors;

controlled rectifier means having ac inputs connected respectively to said first and second ac conductors, dc output rails at which a rectified dc voltage is provided, and at least one gate for controlling the ac power through the rectifier means thus to control the level of voltage at said dc output rails;

bridge inverter circuit means having dc inputs connected to said dc rails and outputs providing said bipolar drive pulses to the armature of said motor;

selector means for selecting a speed in a range including at least a low speed and full speed; and control circuit means having an input coupled to said selector means, a drive output providing an output drive signal to said bridge circuit means at a frequency corresponding to said selected speed, and pickoff voltage selecting means having an output coupled to the gate of said controlled rectifier means so that the level of said rectified dc voltage corresponds with the selected motor speed;

wherein said bridge circuit means includes upper and lower switching transistors and respective gating circuits connected to receive the output drive signal from said control circuit means; wherein said gating circuits each comprise a push-pull arrangement to achieve snap action gating of the respective switching transistor; and wherein said push-pull arrangement includes a complementary pair of transistors having their respective collectors joined to define a gating output.

10. The speed control circuit of claim 1, comprising a speed sensor means providing a motor speed signal to said control circuit means.

11. The speed control circuit of claim 1, wherein said controlled rectifier means includes at least two SCRs arranged in an SCR bridge defining said ac inputs and said dc output rails, and having gates coupled to said control circuit means.

12. Method of applying power to an AC blower motor to power the motor efficiently at a desired blower speed, comprising the steps of producing bipolar pulses, said pulses having a pulse rate and pulse amplitude; selecting a motor speed to correspond to the desired blower speed within a range of speeds between low speed and full speed; controlling the pulse rate as a function of the selected motor speed; controlling the pulse amplitude as a function of the selected motor speed, so that said rate and amplitude vary together; and applying the bipolar pulses as a power wave to the AC blower motor; wherein said applying the bipolar pulses includes applying said power wave to said motor with a power factor approaching unity.

13. Method of applying power according to claim 12, wherein said step of producing said bipolar pulses is achieved by converting an AC line voltage to a DC rail voltage, and converting said DC rail voltage in a bridge inverter circuit into alternating positive and negative pulses; and wherein said step of controlling the pulse amplitude is achieved by controlling the amplitude of said rail voltage.

14. Method of applying power according to claim 12, wherein said step of controlling the pulse amplitude includes applying the input AC line voltage to a rectifier circuit through a thryristor switch, and applying a pickoff voltage signal to said thyristor switch as a function of said selected motor speed.

15. Method of applying power according to claim 12, wherein said power wave has a wave shape that minimizes motor slip and minimizes $I^2R$ loss in the motor by achieving a 98% power factor.

* * * * *